(12) United States Patent
Teichmann et al.

(10) Patent No.: US 11,795,184 B2
(45) Date of Patent: Oct. 24, 2023

(54) HALOGERMANIDES AND METHODS FOR THE PREPARATION THEREOF

(71) Applicant: Evonik Operations GmbH, Essen (DE)

(72) Inventors: Julian Teichmann, Frankfurt am Main (DE); Matthias Wagner, Maintal/ Doernigheim (DE); Hans-Wolfram Lerner, Oberursel (DE)

(73) Assignee: Evonik Operations GmbH, Essen (DE)

( * ) Notice: Subject to any disclaimer, the term of this patent is extended or adjusted under 35 U.S.C. 154(b) by 16 days.

(21) Appl. No.: 17/933,492

(22) Filed: Sep. 20, 2022

(65) Prior Publication Data

US 2023/0048977 A1    Feb. 16, 2023

Related U.S. Application Data

(60) Division of application No. 17/308,590, filed on May 5, 2021, now Pat. No. 11,555,045, which is a division of application No. 16/774,682, filed on Jan. 28, 2020, now Pat. No. 11,053,263, which is a continuation of application No. 15/994,304, filed on May 31, 2018,
(Continued)

(30) Foreign Application Priority Data

Jun. 1, 2017 (EP) .................................. 17173959

(51) Int. Cl.
*C07F 7/30* (2006.01)
*C07F 7/02* (2006.01)
*C07F 19/00* (2006.01)

(52) U.S. Cl.
CPC .............. *C07F 7/30* (2013.01); *C07F 7/025* (2013.01); *C07F 19/005* (2013.01)

(58) Field of Classification Search
None
See application file for complete search history.

(56) References Cited

U.S. PATENT DOCUMENTS

| 3,565,823 | A | 2/1971 | Parshall |
| 3,657,368 | A | 4/1972 | Parshall |

(Continued)

FOREIGN PATENT DOCUMENTS

WO    2004036631 A2    4/2004

OTHER PUBLICATIONS

Combined Chinese Office Action and Search Report issued Apr. 9, 2020 in Chinese Patent Application No. 201810546263.0 (with English translation), citing documents AA, AX and AY therein, 19 pages.

(Continued)

*Primary Examiner* — Clinton A Brooks
(74) *Attorney, Agent, or Firm* — Oblon, McClelland, Maier & Neustadt, L.L.P.

(57) ABSTRACT

A trichlorogermanide of formula (I): $[R_4N]/[R_4P]Cl[GeCl_3]$ (I), where R is Me, Et, iPr, nBu, or Ph, tris(trichlorosilyl) germanide of formula (II): $[R_4N]/[R_4P][Ge(SiCl_3)_3]$ (II), where R is Me, Et, iPr, nBu, or Ph, a tris(trichlorosilyl)germanide adduct of $GaCl_3$ of formula (III): $[Ph_4P][Ge(SiCl_3)_3*GaCl_3]$, and a tris(trichlorosilyl)germanide adduct of $BBr_3$ of formula (IV): $[Ph_4P][Ge(SiCl_3)_3*BBr_3]$. Also, methods for preparing the trichlorogermanides of formula (I), the tris(trichlorosilyl)germanide of formula (II), the tris(trichlorosilyl)germanide adduct of $BBr_3$ of formula (IV).

1 Claim, 5 Drawing Sheets

Related U.S. Application Data

(60) now Pat. No. 10,618,921.

(56) References Cited

U.S. PATENT DOCUMENTS

| | | | |
|---|---|---|---|
| 2004/0224089 | A1 | 11/2004 | Singh et al. |
| 2007/0240632 | A1 | 10/2007 | Singh et al. |
| 2008/0102218 | A1 | 5/2008 | Comita et al. |

OTHER PUBLICATIONS

Extended European Search Report issued Dec. 5, 2017 in Patent Application No. 17173959.2 (with English translation of categories of cited documents), citing documents AA-AD, AH, & AQ-AW therein, 12 pages.

Cummings, C. Y. et al., "A reference electrode for use in supercritical difluoromethane". Electrochimica Acta, vol.187, 2016, XP002775895. pages 323-328.

Futterer, K. et al., "The low-temperature phase sequence gamma - delta - epsilon in halide perovskite tetramethylammonium trichlorogermanate(ll) studied by X-ray diffraction", Journal of Physics: Condensed Matter, vol. 7. 1995, XP055427800. pages 4983-4998.

Ke et al Phys. Chem Chem. Phys, 2012, 14, 1517-1518.

Ke, J, "Electrodeposition of germanium from supercritical fluids". Phys Chem. Chem. Phys. 2012 vol. 14. pages 1517-1528.

Muller. L et al., "Trichlorosilylation of chlorogermanes and chlorostannanes with $HSiCl_3/Net_3$ followed by base-catalysed formation of $(Me_3Ge)_2Si(SiCl_3)_2$ and related branched stannylsilanes". Journal of Organometallic Chemistry, vol. 579, 1999. XP004170561, pages 156-163.

Office Action issued Oct. 11, 2021 in corresponding Japanese Patent Application No. 2018-106112 (with English Translation), citing document AX therein. 10 pages.

Parshall, G. W., "Catalysis in Molten Salt Media", Journal of the American Chemical Society, vol. 94, No. 25, Dec. 13, 1972, XP55368902, pages 8716-8719.

Peerless, B. et al., "Homoleptic low-valent polyazides of group 14 elements", Chem, Commun., 2015, vol. 51, pages 7435 - 7438 with cover Additional References sheet(s) attached page.

Peerless, B. et al., "Homoleptic Low-Valent Polyazides of Group 14 Elements", Electronic Supplementary Material (ESI) for Chem-Chomm. The Royal Society of Chemistry, 2015. XP55427835, pages S1-S46.

Poskozim, P. S. et al., "Methylammonium trichlorogermanate(II) salts". Journal of Inorganic Nuclear Chemistry, vol. 32. 1970, XP002775894. pages 1391- 1393.

Tripathi, Upendra M. et al., "The trichlorogermanite(ll) Anion and its Gold(l) Complexes", Zeitschrift fuer Naturforschung, B: Chemical Sciences,1998, 53(9), pp. 939 - 945.

Winkler. B. et al., "Dynamics of $N(CH_3)_4GeCl_3$", Physica B 234-236.1997. XP055427809, pages 70-71.

HALOGERMANIDES AND METHODS FOR THE PREPARATION THEREOF

CROSS REFERENCE TO RELATED APPLICATIONS

The present application application is a divisional of U.S. Pat. Application 17/308,590 filed May 5, 2021, pending, which is a divisional of U.S. Pat. Application 16/774,682, filed on Jan. 28, 2020, now U.S. Pat. No. 11,053,263, which is a continuation of U.S. Pat. Application 15/994,304, now U.S. Pat., 10,618,921, filed on May 31, 2018, which claims priority to EP Application No. 17173959.2, filed on Jun. 1, 2017, the entire contents of each of which are hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

Field of the Invention

The present invention relates to novel halogermanides and a method for the preparation thereof.

Description of the Related Art

Halosilanes, polyhalosilanes, halogermanes, polyhalogermanes, silane, polysilanes, germane, polygermanes and corresponding mixed compounds have long been known, cf., in addition to the customary text books of inorganic chemistry, also WO 2004/036631 A2 or C.J. Ritter et al., J. Am. Chem. Soc., 2005, 127, 9855-9864.

L. Müller et al. in J. Organomet. Chem., 1999, 579, 156-163 describe, inter alia, the preparation of trichlorosilylmethylgermanes.

Methylgermylsilanes and phenylgermylsilanes are known from Angew. Chem., 1993, 105, 587-588 (G. Sih et al.) and also from Tetrahedron Lett., 1970, 51, 4443-4447 (F. Feher et al.).

Furthermore, phenyl- and hydrogen-containing compounds are known in which Sn—Si and Sn—Ge bonds are present (J.B. Tice et al., J. Inorganic Chemistry, 2009, 48(13), 6314-6320). Here, it is suggested to use these compounds as IR semiconductors.

In patent document US 7,540,920 B2, Singh et al. disclose Si—Ge compounds of the formula $X_1X_2X_3$ —Si —Ge— $X_4X_5X_6$ having hydrogen or halogen radicals $X_{1-6}$.

BRIEF SUMMARY OF THE INVENTION

Practically nothing is currently known about chlorosilylarylgermanes. Thus, by means of basic research, effort is being made to find novel compounds and to seek novel preparation routes, in particular also with respect to potential industrial and optionally improvable applications.

The object of the present invention is to provide novel germanium and silicon-germanium compounds and also a method for the preparation thereof.

New synthetic possibilities for preparing silicon-germanium compounds, particularly $R_3Ge—SiCl_3$,
$Cl_3Si—GeR_2—GeR_2—SiCl_3$,
$Cl_3Ge—SiCl_3$,
$[Ph_4P][Ge(SiCl_3)_3]$,
$[Ph_4P][Ge(SiCl_3)_3*GaCl_3]$,
$[Ph_4P][Ge(SiCl_3)_3*BBr_3]$ by the reaction of chlorinated or perchlorinated, organic or inorganic germanium compounds of the type $R_nGeCl_{4-n}$ (n = 0,2,3) with hexachlorodisilane with addition of catalytic amounts of an ammonium chloride salt $[R_4N]Cl$ where the radicals R = Me, Et, iPr, nBu were presented in the patent applications entitled "Neue Chlorsilylarylgermane, Verfahren zu deren Herstellung und deren Verwendung" (Novel chlorosilylarylgermanes, methods for preparation thereof and use thereof) and "Triphenylgermylsilan, Verfahren zur Herstellung und seine Verwendung" (Triphenylgermylsilane, method of preparation and its use). By means of the reaction, various silicon-germanium compounds are obtained.

In addition, it has been found that reactants of the type $R_3GeCl$ are converted by the reaction with $Si_2Cl_6$ in the presence of ammonium chloride, whereupon a Ge—Si bond is formed at the Ge—Cl position. In the reaction of $R_2GeCl_2$ with $Si_2Cl_6$/ammonium chloride, the Ge—Si bond formation takes place at only one Ge—Cl position. In addition, Ge—Ge bond formation occurs at the second Ge—Cl position. The germanium-silicon compound thus found or prepared can be converted with $LiAlH_4$ to silicon hydride compounds. In the context of the invention, such compounds are prepared by the synthesis of $Ph_3Ge—SiH_3$ from $Ph_3Ge—SiCl_3$ for example. In the case of reactions of compounds of the type $R_nGeCl_{4-n}$ (n = 0), different reactions take place depending on the stoichiometry.

[R4N][GeCl3] salts (GeCl4:Si2Cl6:[R4N]Cl, 1:1:1),
$Cl_3Si—GeCl_3$(GeCl4:Si2Cl6:[R4N]Cl, 1:1:0.1), or
[Ph4P][Ge(SiCl3)3] (GeCl4:Si2Cl6:[Ph4P]Cl, 1:4:1)
were produced. $[Ph_4P][Ge(SiCl_3)_3]$ can be reacted with Lewis acids, abbreviated to "LA", to give the corresponding adducts $[Ph_4P][Ge(SiCl_3)_3*LA]$.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1A:
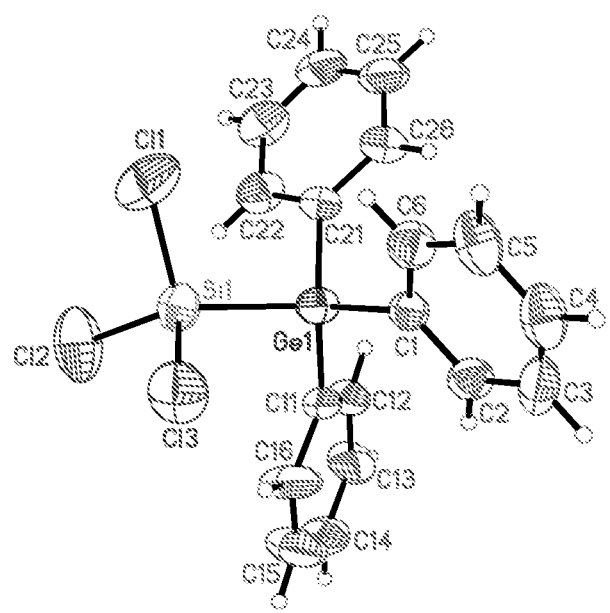
FIG. 1A: Crystal Structure of trichlorosilyltriphenylgermane (1).

In the context of the invention, the measure "equivalent", "eq." for short, is understood to mean the amount of catalyst in mol based on the amount of hexachlorodisilane in mol. For example, 0.1 eq of catalyst denotes 0.1 mol of catalyst per mole of hexachlorodisilane or 10 mol% of catalyst based on hexachlorodisilane.

In the context of the invention, "hexachlorodisilane" is also abbreviated to "HCDS".

Chlorosilylarylgermanes are prepared by
(a) dissolving an arylchlorogermane with hexachlorodisilane in a solvent and
(b) reacting in the presence of a catalyst at a temperature of 5 to 40° C., wherein the aryl groups of the arylchlorogermane are each independently phenyl.

The chlorosilylarylgermanes can be selected from the series comprising trichlorosilyltriphenylgermane and/or 1,2-bis(trichlorosilyl)-1,1,2,2-tetraphenyldigermane.

Step (b) of said preparation method can be carried out at room temperature.

In step (a) of the method, a triarylchlorogermane may be used in a molar ratio to hexachlorodisilane of 1:1 and/or a diaryldichlorogermane may be used in a molar ratio to hexachlorodisilane of 1:2.

Furthermore, it is possible to use an arylchlorogermane from the series comprising triphenylchlorogermane and/or diphenyldichlorogermane.

The solvent used in step (a) may be selected to be inert in order to avoid undesired reactions with HCDS. Furthermore, dichloromethane may be used since this does not react with HCDS in the chosen temperature ranges.

When carrying out the method according to the invention, phosphonium chlorides [R$_4$P]Cl or ammonium chloride salts [R$_4$N]Cl may be used as catalyst, where the radicals R are selected from Me, Et, iPr, nBu, Ph.

In this case, the reaction proceeds more slowly the less catalyst used. On the other hand, excessively large amounts of catalyst are undesirable since this has to be removed at the end of the reaction. The method can be carried out economically with respect to the separation complexity if the catalyst is used in an amount of 0.001 to 1 mol per mole of hexachlorodisilane. The method is carried out particularly favourably if 0.01 to 0.1 mol is used per mole of hexachlorodisilane.

A further aspect of carrying out the method economically is the selection of the amount of solvent. In the method, at least 5 mol of solvent can be used per mole of hexachlorodisilane, preferably 10 mol to 100 mol of solvent per mole of hexachlorodisilane.

In the method, the reaction may be carried out with thorough mixing, preferably with stirring, and over a period of 1 to 24 hours, preferably over the course of 12 h, and further preferably under protective gas, preferably under nitrogen or argon. The solvent can be subsequently removed. This can be undertaken preferably in a dry oxygen-free environment, particularly preferably in an isolated environment, for example in a glove box, and further preferably at standard pressure or under reduced pressure, preferably in the range of 1 to 500 hPa, wherein chlorosilylarylgermanes are obtained as crystalline product.

The trichlorosilyltrichlorogermane molecule of interest can also be prepared, which has already been disclosed by Singh et al. (US 7,540,920 B2) without a method of preparation. For this purpose, GeCl$_4$ is used instead of the arylchlorogermane. The conversion reaction with hexachlorodisilane is then subsequently carried out in a solvent and in the presence of a catalyst.

In the preparation of trichlorosilyltrichlorogermane, GeCl$_4$ is dissolved with hexachlorodisilane in a solvent and the reaction is conducted in the presence of a catalyst at a temperature of 5 to 40° C.

It can be advantageous to use the catalyst in amounts of 0.001 to 1 eq., preferably 0.01 to 0.1 eq. Example 3 describes an exemplary procedure of this method.

If this method is further modified by using the ammonium chloride salt [R$_4$N]Cl or phosphonium chloride salts [R$_4$P]Cl in a stoichiometric amount instead of a catalytic amount, preferably from 0.5 to 1.5 eq., particularly preferably 1 eq., then halogermanides are surprisingly obtained, namely trichlorogermanide on using [R$_4$N]Cl.

The invention therefore provides trichlorogermanides of the general formula I

[R$_4$N]/[R$_4$P]Cl[GeCl$_3$], (I)

where R = Me, Et, iPr, nBu.

In the context of the invention, "[R$_4$N]/[R$_4$P]Cl" in the formula I is understood to mean that phosphonium or ammonium salts are obtained.

The invention also relates to a method for preparing trichlorogermanides (I) according to the invention, by dissolving GeCl$_4$ with hexachlorodisilane in a solvent and reacting in the presence of a stoichiometric amount of [R$_4$N]Cl or [R$_4$P]Cl at a temperature of 5 to 40° C.

Example 4 describes a preferred procedure where R = nBu.

The synthesis carried out according to Example 4 presents a novel possibility of obtaining [R$_4$N][GeCl$_3$] salts and [R$_4$P]Cl[GeCl$_3$] salts, by varying the cation [R$_4$N]$^+$ or [R$_4$P]$^+$ and by using the desired chloride salt for the heterolytic cleavage of Si$_2$Cl$_6$. This is particularly interesting since it has been found that the cation determines how well a compound crystallizes.

For instance, a large variety of [R$_4$N][GeCl$_3$] salts and [R$_4$P]Cl[GeCl$_3$] salts can be prepared in accordance with the invention.

If, in a modification of the method, the starting materials Si$_2$Cl$_6$ and GeCl$_4$ are used in a ratio of 4:1 with addition of stoichiometric amounts of [R$_4$N]Cl or [R$_4$P]Cl, tris(trichlorosilyl)germanide is surprisingly obtained.

For example, [Ph$_4$P]Cl can be used (Example 5).

The invention likewise provides tris(trichlorosilyl)germanide of the formula II,

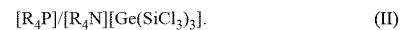

[R$_4$P]/[R$_4$N][Ge(SiCl$_3$)$_3$]. (II)

The invention therefore likewise provides a method for preparing the tris(trichlorosilyl)germanide (II) according to the invention, by dissolving hexachlorodisilane with GeCl$_4$ in a solvent and reacting in the presence of a stoichiometric amount of [R$_4$N]Cl or [R$_4$P]Cl at a temperature of 5 to 40° C.

A preferred ratio of hexachlorodisilane to GeCl$_4$ is 4:1.

The stoichiometric amount used is preferably from 0.5 to 1.5 eq., particularly preferably 1 eq.of [R$_4$N]Cl or [R$_4$P]Cl. An illustrative synthesis of the germanide (II) according to the invention is more particularly elucidated in Example 5.

If the tris(trichlorosilyl)germanide according to the invention or obtained according to the invention is reacted with GaCl$_3$, tris(trichlorosilyl)germanide adduct of GaCl$_3$ is obtained:

[Ph$_4$P][Ge(SiCl$_3$)$_3$*GaCl$_3$].

The invention therefore likewise provides the adduct of the formula III,

[Ph$_4$P][Ge(SiCl$_3$)$_3$*GaCl$_3$], (III)

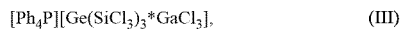

and likewise the method for preparation thereof by mixing the tris(trichlorosilyl)germanide according to the invention or obtained according to the invention with GaCl$_3$ and dissolving the resulting mixture in dichloromethane with stirring, whereupon the adduct III is obtained at a temperature of 5 to 40° C. over a period of 1 to 24 hours.

A more detailed elucidation of the synthesis is specified in Example 6.

Instead of the reaction according to the invention of tris(trichlorosilyl)germanide with GaCl$_3$, tris(trichlorosilyl) germanide can be reacted with BBr$_3$. In this case, the tris(trichlorosilyl)germanide adduct of BBr$_3$ is found.

The invention therefore likewise provides the adduct of the formula IV,

[Ph$_4$P][Ge(SiCl$_3$)$_3$*BBr$_3$], (IV)

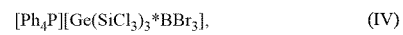

and likewise the method for preparation thereof by mixing the tris(trichlorosilyl)germanide according to the invention or obtained according to the invention with BBr$_3$ and dissolving the resulting mixture in dichloromethane with stirring, whereupon the adduct IV is obtained at a temperature of 5 to 40° C. over a period of 1 to 120 hours.

A more detailed elucidation of this synthesis is specified in Example 7.

The Ge or Si-Ge compounds according to the invention or prepared in accordance with the invention may serve as precursors for materials which are used for the controlled deposition of thin Si-Ge layers.

The examples which follow provide additional illustration of the present invention without restricting the subject matter. The term "room temperature" is abbreviated to "RT" in the examples.

Analytical Methods for Determination of the Crystal Structure

The data for all structures were collected at 173 K using a STOE IPDS II dual beam diffractometer using a Genix microfocus tube with mirror optics using MoK$_\alpha$ radiation (λ = 0.71073 Å) and scaled using the frame scaling procedure of the X-AREA program (Stoe & Cie, 2002). The structures were solved by direct methods with the aid of the SHELXS program (Sheldrick, 2008) and refined on F$^2$ by the full matrix least squares technique. Cell parameters were determined by refinement on θ values of the reflections with I>6σ(I).

Input Materials

Hexachlorodisilane, "HCDS" for short, GeCl$_4$ from Evonik Industries AG, triphenylchlorogermane, diphenyldichlorogermane.

Example 1: Preparation of Trichlorosilyltriphenylgermane (1)

The synthesis was carried out according to Equation 1 from Ph$_3$GeCl and Si$_2$Cl$_6$ with addition of a catalytic amount of 0.1 eq of [nBu$_4$N]Cl.

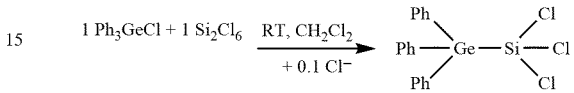

Equation 1: Reaction of Ph$_3$GeCl and Si$_2$Cl$_6$ with addition of a catalytic amount of 0.1 eq of [nBu$_4$N]Cl.

To a clear colourless solution of 500 mg, corresponding to 1.47 mmol, of Ph$_3$GeCl and 40 mg or 0.14 mmol of [nBu$_4$N] Cl in 5 ml or 78.3 mmol of CH$_2$Cl$_2$ were added at room temperature while stirring 400 mg, corresponding to 1.49 mmol, of Si$_2$Cl$_6$. A clear colourless reaction solution was obtained which was stirred at room temperature over the course of 12 h. A crude product in the form of a colourless crystalline solid 1 could be isolated from the reaction solution after slow removal of the solvent. The yield was 59%. The crude product still comprised up to about 30% of the reactant Ph$_3$GeCl. By X-ray diffractometry, it was possible to determine the crystal structure of 1 (FIG. 1A). The unmarked atoms in the figure represent hydrogen.

Figure 1B:
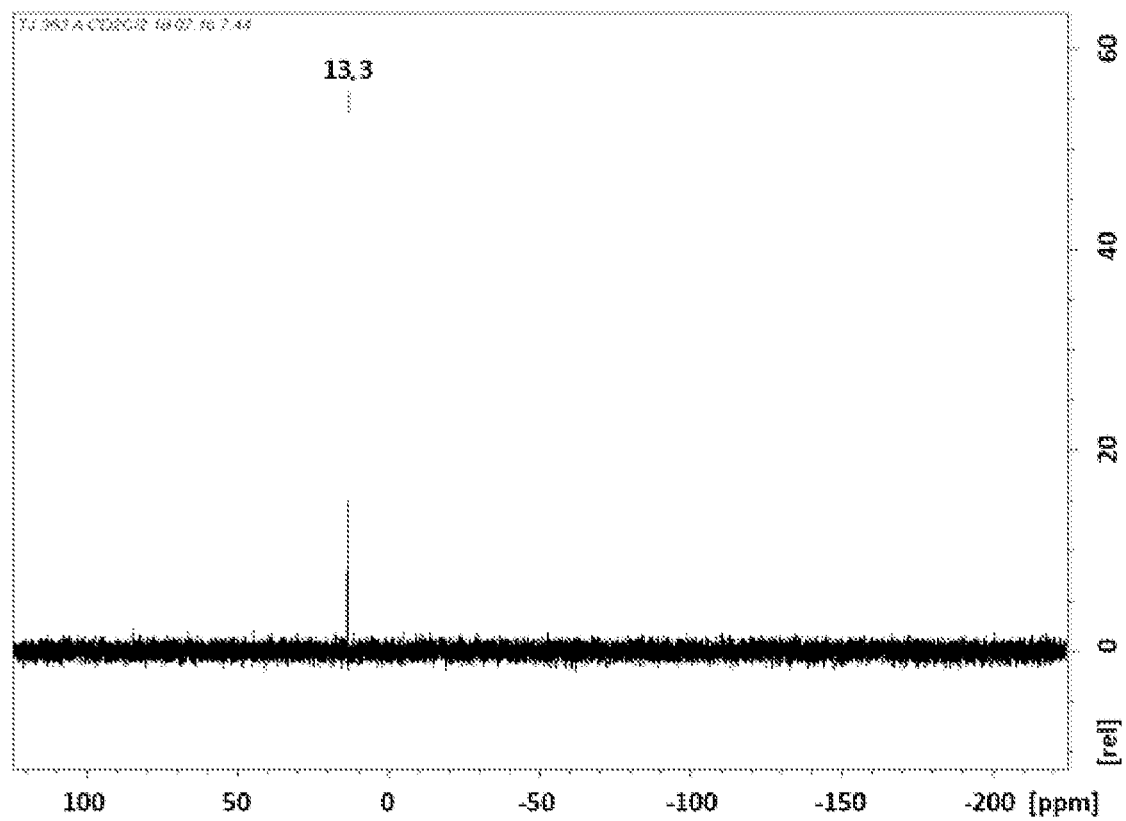
FIG. 1B: $^{29}$Si-NMR spectrum of the crude product of the synthesis of trichlorosilyltriphenylgermane (1).

The $^{29}$Si-NMR spectrum of 1 is shown in FIG. 1B.

All results of a $^1$H, $^{13}$C and $^{29}$Si NMR spectroscopic investigation:

$^{29}$Si-NMR (99.4 MHz, CD$_2$Cl$_2$, 298 K):
δ = 13.3.

$^1$H-NMR (500.2 MHz, CD$_2$Cl$_2$, 298 K):
δ = 7.58 (m); 7.75 (dd $^3$J(H,H) = 8.0 Hz, $^2$J(H,H) = 1.4 Hz).

$^{13}$C-NMR (125.0 MHz, CD$_2$Cl$_2$, 298 K):
δ = 128.9; 130.1; 132.2; 135.3.

Example 2: Preparation of 1,2-Bis(Trichlorosilyl)-1,1,2,2-Tetraphenyldigermane (2)

The synthesis was carried out according to Equation 2 from Ph$_2$GeCl$_2$ and Si$_2$Cl$_6$ with addition of catalytic amounts (0.1 eq) of [nBu$_4$N]Cl.

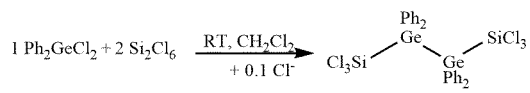

Equation 2: Reaction of Ph$_2$GeCl$_2$ and Si$_2$Cl$_6$ with addition of catalytic amounts (0.1 eq) of [nBu$_4$N]Cl.

To a clear colourless solution comprising 500 mg or 1.68 mmol of Ph$_2$GeCl$_2$ and 90 mg or 0.32 mmol of [nBu$_4$N]Cl in 5 ml or 78.3 mmol of CH$_2$Cl$_2$, Si$_2$Cl$_6$ was added at room temperature. The resulting reaction solution was subsequently stirred over the course of 12 h.

Figure 2:
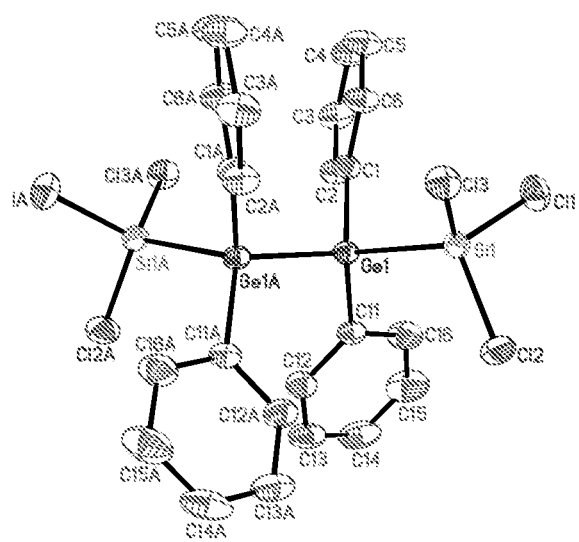
FIG. 2: Crystal Structure of 1,2-bis(trichlorosilyl)-1,1,2,2-tetraphenyldigermane (2).

A crude product 2 could be obtained in a yield of 77% from the reaction solution after slow removal of the solvent which could be isolated by extraction with Et$_2$O and subsequent crystallization. The yield in this case was 57%. By X- ray diffractometry, it was possible to determine the crystal structure of 2, shown in FIG. 2.

All results of a $^1$H, $^{13}$C and $^{29}$Si NMR spectroscopic investigation:

$^{29}$Si-NMR (99.4 MHz, CD$_2$Cl$_2$, 298 K):
δ = 12.3
$^1$H-NMR (500.2 MHz, CH$_2$Cl$_2$, 298 K):
δ = 7.41 (t $^3$J(H,H) = 7.2 Hz (2H)), 7.47 (d $^3$J(H,H) =

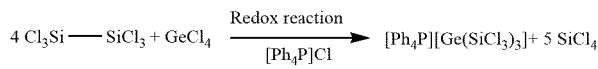

7.2 Hz (1H)), 7.56 (d $^3$J(H,H) = 7.2 Hz (2H)).
$^{13}$C-NMR (125.0 MHz, CH$_2$Cl$_2$, 298 K):
δ= 129.0; 130.1; 131.8; 136.0.

Example 3: Preparation of Trichlorosilyltrichlorogermane (3)

The synthesis was effected according to Equation 3 from GeCl$_4$ and Si$_2$Cl$_6$ (1:1) with addition of 0.1 eq. of [nBu$_4$N]Cl as a catalytic amount.

Equation 3: Reaction of GeCl$_4$ and Si$_2$Cl$_6$ (1:1) with addition of a catalytic amount (0.1 eq.) of the catalyst where R = Bu: [nBu$_4$N]Cl.

To a clear colourless solution comprising 100 mg or 0.4 mmol of [nBu$_4$N]Cl in a 30:70 mixture of GeCl$_4$ and CH$_2$Cl$_2$ was added at room temperature 1 g or 3.7 mmol of Si$_2$Cl$_6$ and the reaction mixture thus obtained was stirred at room temperature over the course of 12 h. The product 3 was condensed with other volatile constituents from the reaction solution into a nitrogen-cooled receiver. Subsequent distillation at 140° C. at 1013 hPa resulted in the isolation of pure 3 as a clear colourless liquid in a yield of 22%.

Figure 3:
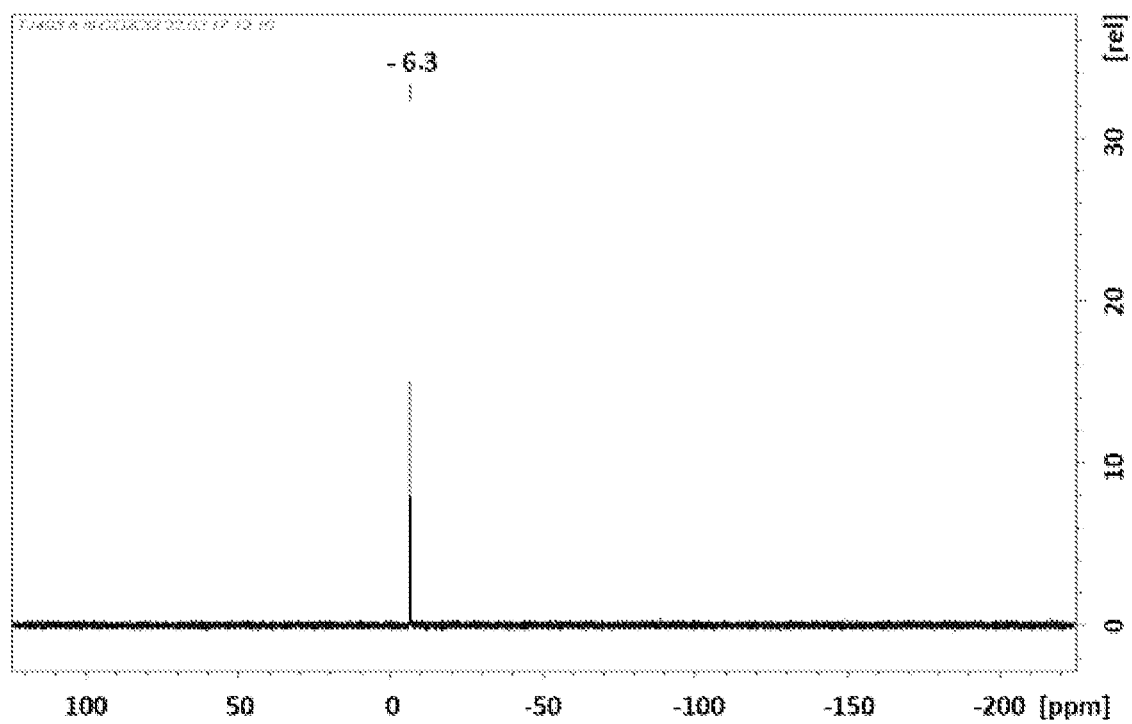
FIG. 3: $^{29}$Si-NMR spectrum of trichlorosilyltrichlorogermane (3).

The $^{29}$Si-NMR spectrum of 3 is shown in FIG. 3.
All results of a $^{29}$Si-NMR spectroscopic investigation:
$^{29}$Si-NMR (99.4 MHz, CH$_2$Cl$_2$, 298 K):
δ = - 6.3.

Example 4: Preparation of trichlorogermanide (4).

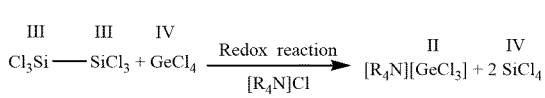

The procedure was as in Example 3 but with the difference that [nBu$_4$N]Cl was used in a stoichiometric amount synonymous to 1 eq. The conversion reaction was effected in a redox reaction according to Equation 4.

Equation 4: Reaction of GeCl$_4$ and Si$_2$Cl$_6$ (1:1) with addition of a stoichiometric amount, namely 1 eq., of [nR$_4$N]Cl where R = Bu.

Figure 4:
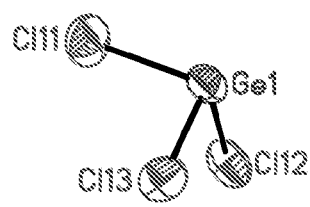
FIG. 4: Crystal structure of trichlorogermanide (4).

To a clear colourless solution of 300 mg or 1.4 mmol of GeCl$_4$ and 390 mg or 1.4 mmol of [nBu$_4$N]Cl in CH$_2$Cl$_2$ were added at room temperature 375 mg or 1.4 mmol of Si$_2$Cl$_6$ and the reaction mixture thus obtained was stirred over the course of 12 h. Trichlorogermanide 4 could be isolated from the reaction solution as a yellow crystalline solid after slow removal of the solvent. By means of X-ray diffractometry, the structure of 4 could be determined, shown in FIG. 4. For reasons of clarity, the cation [nBu$_4$N]$^+$ is not depicted here.

Example 5: Preparation of Tris(Trichlorosilyl) Germanide (5)

The synthesis was effected according to Equation 5 from GeCl$_4$ and Si$_2$Cl$_6$ in a molar ratio of 1:4 with addition of a stoichiometric amount, in this case 1 eq., of [Ph$_4$P]Cl.

Equation 5: Reaction of GeCl$_4$ and Si$_2$Cl$_6$ (1:4) with addition of a stoichiometric amount (1 eq.) of [Ph$_4$P]Cl.

Figure 5A:
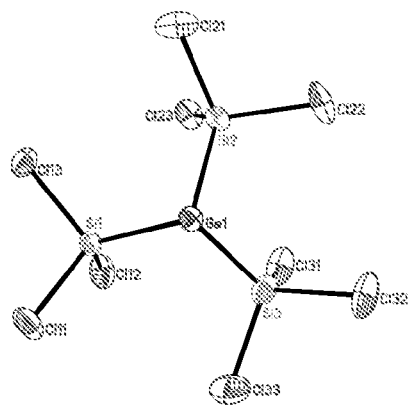
FIG. 5A: Crystal structure of tris(trichlorosilyl)germanide (5).

To a clear colourless solution comprising 93 mg or 0.4 mmol of GeCl$_4$ and 163 mg or 0.4 mmol of [Ph$_4$P]Cl in CH$_2$Cl$_2$ as solvent were added at room temperature 478 mg or 1.7 mmol of Si$_2$Cl$_6$ and the reaction mixture thus obtained was stirred over the course of 12 h. 5 could be isolated in 99% yield from this mixture as a yellow crystalline solid after slow removal of the solvent. By means of X-ray diffractometry, the crystal structure of 5 could be determined, shown in FIG. 5A. For reasons of clarity, the cation [Ph$_4$P]$^+$ is not depicted here.

In this reaction there is a reduction of the GeCl$_4$. In addition, a three-fold silylation of the germanium atom takes place.

Figure 5B:
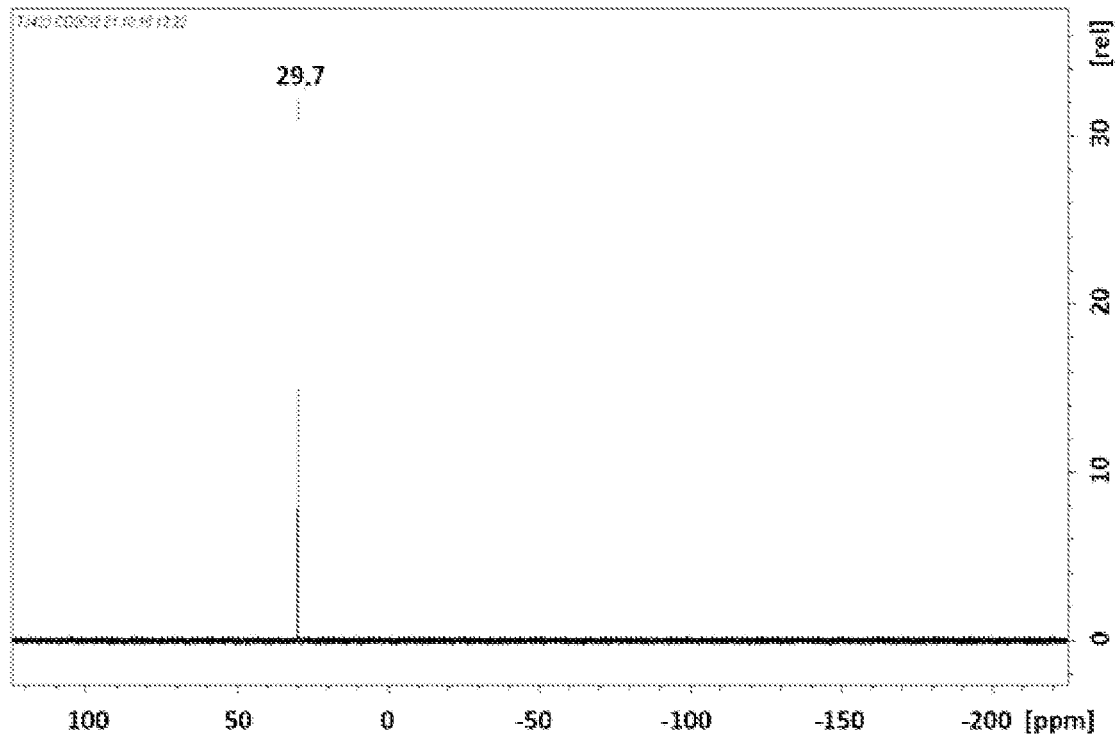
FIG. 5B: $^{29}$Si-NMR spectrum of tris(trichlorosilyl)germanide (5).

The $^{29}$Si-NMR spectrum of 5 is shown in FIG. 5B.
All results of a $^1$H- and $^{29}$Si-NMR spectroscopic investigation:
$^{29}$Si-NMR (99.4 MHz; CD$_2$Cl$_2$; 298 K):
δ = 29.7.
$^1$H-NMR (500.2 MHz; CD$_2$Cl$_2$; 298 K):
δ = 7.54 (qd $^3$J(H,H) = 4.5 Hz; $^2$J(H,H) = 1.3 Hz; (2H));
7.68 (td $^3$J(H,H) =7.4 Hz; $^3$J(H,H) = 3.4 Hz (2H)); 7.84 (tt $^3$J(H,H) = 7 Hz; $^2$J(H,H) = 1.0 Hz (1H)).

Example 6: Preparation of Tris(Trichlorosilyl) Germanide Adduct of GaCl$_3$ (6)

The synthesis of 6 was effected according to Equation 6 from tris(trichlorosilyl)germanide (5) and GaCl$_3$.

Equation 6: Reaction of 5 with GaCl$_3$.

50 mg or 0.1 mmol of 5 and 10 mg or 0.1 mmol of GaCl$_3$ were mixed as solids at room temperature and subsequently dissolved completely in CH$_2$Cl$_2$. The clear yellow reaction mixture was stirred at room temperature over the course of 12 h. 6 could be obtained from the clear yellow reaction solution as a yellow crystalline solid in a yield of 82% after slow removal of the solvent.

Figure 6A:
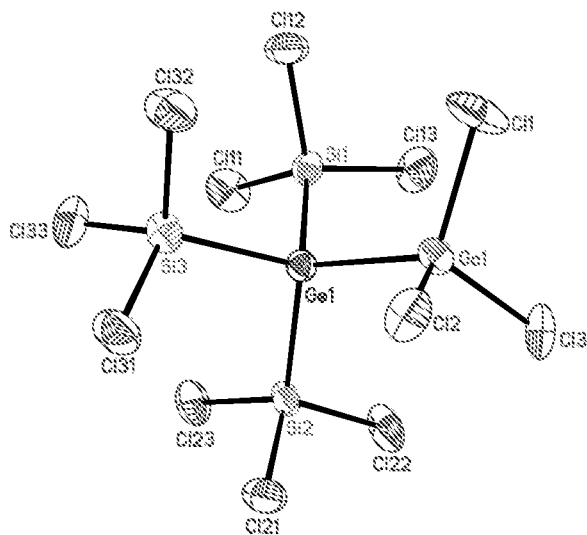
FIG. 6A: Crystal structure of tris(trichlorosilyl)germanide adduct of $GaCl_3$ (6).

By means of X-ray diffractometry, the crystal structure of 6 could be determined, shown in FIG. 6A. For reasons of clarity, the cation [Ph$_4$P]$^+$ is not depicted here.

Figure 6B:
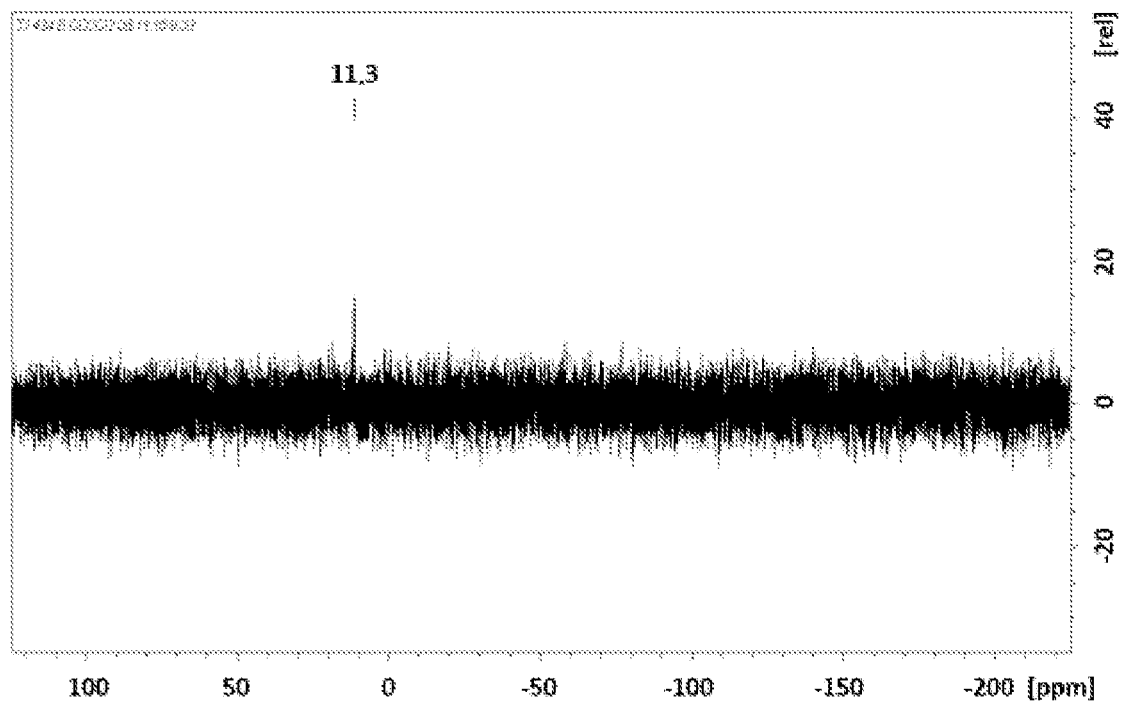
FIG. 6B: $^{29}$Si-NMR spectrum of tris(trichlorosilyl)germanide adduct of GaCl$_3$ (6).

The $^{29}$Si-NMR spectrum of 6 is shown in FIG. 6B.
All results of a $^1$H- and $^{29}$Si-NMR spectroscopic investigation:
$^{29}$Si-NMR (99.4 MHz, CD$_2$Cl$_2$, 298 K):
δ = 11.3.
$^1$H-NMR (500.2 MHz; CD$_2$Cl$_2$; 298 K):
δ = 7.54 (qd $^3$J(H,H) = 4.5 Hz; $^2$J(H,H) = 1.3 Hz; (2H));
7.68 (td $^3$J(H,H) =7.4 Hz; $^3$J(H,H) = 3.4 Hz (2H)); 7.84 (tt $^3$J(H,H) = 7 Hz; $^2$J(H,H) = 1.0 Hz (1H)).

Example 7: Preparation of Tris(Trichlorosilyl) Germanide Adduct of BBr$_3$ (7)

The synthesis of 7 was effected according to Equation 7 from tris(trichlorosilyl)germanide (5) and BBr$_3$.

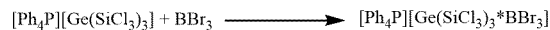

Equation 7: Reaction of 5 with BBr$_3$.

Figure 7A:
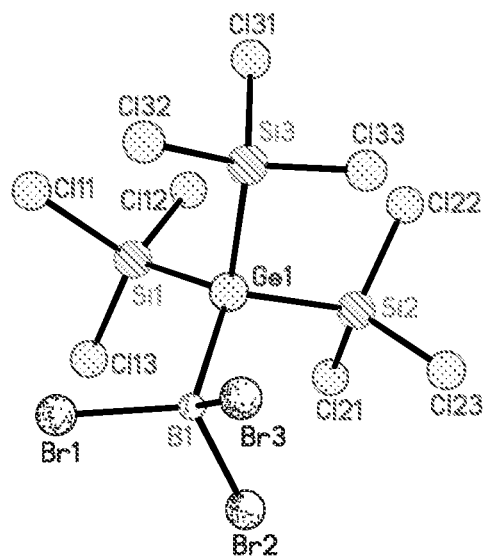
FIG. 7A: Crystal structure of tris(trichlorosilyl)germanide adduct of BBr$_3$ (7).

BBr$_3$ was added at room temperature to a clear yellow solution of 5 in CH$_2$Cl$_2$. After 4 days, colourless crystals had precipitated from the yellow reaction solution thus obtained. By means of X-ray diffractometry, the crystal structure of 7 could be determined, shown in FIG. 7A. For reasons of clarity, the cation [Ph$_4$P]$^+$ is not depicted here.

Figure 7B:
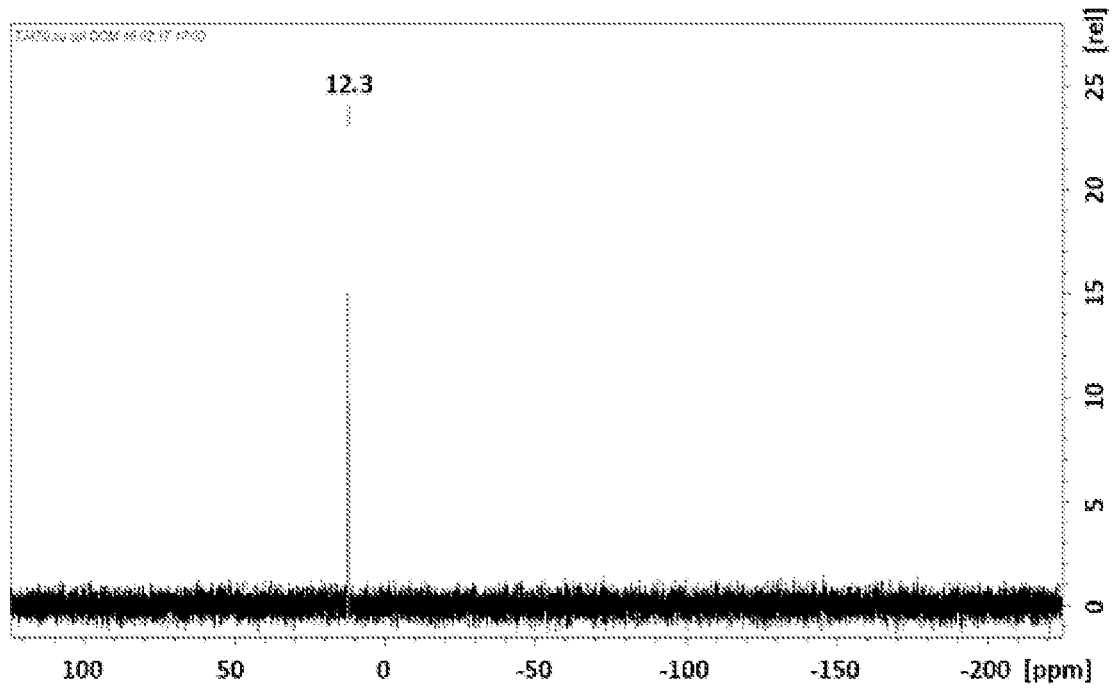
FIG. 7B: $^{29}$Si-NMR spectrum of tris(trichlorosilyl)germanide adduct of BBr$_3$ (7).

The $^{29}$Si-NMR spectrum of 7 is shown in FIG. 7B.

All results of a $^{11}$B- and $^{29}$Si-NMR spectroscopic investigation $^{29}$Si-NMR (99.4 MHz, CD$_2$Cl$_2$, 298 K):
δ = 12.3.
$^{11}$B-NMR (160.5 MHz; CD$_2$Cl$_2$; 298 K):
δ = -17.5.

The invention claimed is:

1. A method for preparing a tris(trichlorosilyl)germanide adduct of BBr$_3$ of formula (IV):

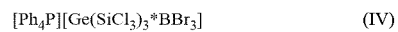      (IV)

the method comprising:
mixing tris(trichlorosilyl)germanide of formula (II):

      (II)

wherein R = Ph,
with BBr$_3$, to obtain a mixture;
dissolving the resulting mixture in dichloromethane with stirring; and
obtaining the tris(trichlorosilyl)germanide adduct at a temperature of 5 to 40° C. over a period of 1 to 120 hours.

* * * * *